Patented Sept. 25, 1945

2,385,722

UNITED STATES PATENT OFFICE 2,385,722

METHOD OF FORMING MOLDED ARTICLES

Victor A. Navikas, Lancaster, Pa., assignor to Armstrong Cork Company, Lancaster, Pa., a corporation of Pennsylvania No Drawing. Application November 27, 1943, Serial No. 512,045

7 Claims. (Cl. 18—56)

My invention relates to a method of forming molded articles, and particularly screw threaded closures or like articles of intricate shape, requiring high resistance to deformation, great strength, and a limited tendency to absorb or retain liquids, from essentially a paper web carrying a thermoplastic zein and Vinsol binding material. An object of my invention is to provide a method whereby the pieces may be hot molded from a flat sheet or a partially preformed shape (as contrasted with a molding powder which is disclosed in my copending application, Serial No. 512,044, filed November 27, 1943) and may be removed from the forming dies without the necessity of cooling down the dies or molded piece, the piece in the condition in which it exists at the termination of the molding cycle possessing adequate strength to permit such removal without deformation and without any tendency to stick to the mold elements.

Heretofore in the manufacture of closures and similar articles from molding compositions including a thermoplastic binder or matrix, it has always been necessary to first heat the piece to be molded to render the thermoplastic material flowable and thus permit the molding composition to assume the mold contour and then cool at least the surface of the formed article so that the same may be removed from the mold element without distortion or sticking. This requires intermittent heating and cooling of the mold elements and a long molding cycle.

One attempt to overcome this difficulty and produce articles directly from the molds without cooling has been suggested by a prior applicant who teaches that by laminating paper stock in such manner that the central portion will contain a thermoplastic material and the outer and inner portions will contain a thermosetting material, it is possible to mold directly and without cooling since the thermosetting material of the covering sheets will be in contact with the mold surfaces when the article is formed to the desired shape and, since such materials do not flow after heat setting, it is possible to remove the piece as soon as the molding cycle is completed. In other words, in the manufacture of a closure, a disc of laminated paper consisting of a heavy central layer of kraft paper fibers containing rosin or other similar thermoplastic material is faced on both sides with relatively thin layers of kraft paper saturated with a thermosetting resin such as phenol formaldehyde or urea formaldehyde in uncured condition. This disc is fed into a semipositive type mold and heat and pressure are applied. The heat is sufficient first, to soften the thermoplastic resin and permit the stock to be molded to the desired contour, and second, to set the thermosetting resin in the facing layers. Once the facing layers are set, the product has sufficient strength so that it may be removed from the mold without undue distortion even though the central layer may still be in a plastic or semi-plastic condition. The facing layers of thermosetting material prevent adhesion to the molds. This same product without the facing layers would inevitably adhere to the molds and could not be removed without first cooling the piece at the surface in contact with the mold elements to a substantially solid condition. This requires considerable time and prevents the rapid formation of the articles.

I have discovered that a satisfactory article may be produced using a zein and Vinsol composition, a truly thermoplastic material, as the binder or matrix for the paper stock, provided certain critical limitations are carefully observed.

The basic ingredients are zein, a corn protein, and a gasoline insoluble pine wood resin sold under the trade-mark "Vinsol" and prepared by chipping pine wood, preferably southern long leaf pine stump wood, steaming and extracting with a coal tar hydrocarbon such as benzol, evaporating the solvent, and removing turpentine and pine oil by distillation. The residue is extracted, preferably at an elevated temperature, with a petroleum hydrocarbon selective solvent such as gasoline, petroleum ether, or the like to remove the FF rosin. After this extraction, a dark-colored, resinous substance remains which when freed from occluded gasoline constitutes "Vinsol." This resinous substance is characterized by substantial insolubility in gasoline though a minor fraction, about 15%, that is gasoline soluble may be present after the gasoline extraction. For the sake of brevity, the term "Vinsol" will be used to designate the product.

I have found that if zein is modified with Vinsol in proportions ranging from 75 parts of zein and 25 parts of Vinsol to 67 parts of zein and 33 parts of Vinsol, and if such material is distributed throughout a paper stock in the form of discrete particles as contrasted with a saturation or partial saturation of the web, an article may be formed at temperatures between 250° F. and 300° F. and removed from the mold immediately upon completion of the formation.

The following example is intended to illustrate the preferred method of manufacture but is not intended to limit the invention to such method, for, as stated above, there is some leeway permissible in the compounding of the basic ingredients and in the temperature of molding. Other steps in the method are more or less critical as will be made clear from the following description.

In the preparation of the base stock, I first charge into a ball mill 75 parts by weight of zein and 25 parts by weight of Vinsol. Both of these materials are relatively hard and are obtainable commercially in powder form. Preferably, a fine powder is used, in the neighborhood of 300 mesh size. The mixing in the mill is continued until a uniform interspersion of the particles is obtained. About 30 parts by weight of the above mixture of zein are Vinsol and added to 70 parts by weight of kraft paper fibers in a beater. The stock consistency is maintained relatively low to provide a good distribution of the binder particles and to form a sheet of low density. Pulping is continued until the particles of binder are uniformly distributed throughout the stock. The stock is then sheeted onto a screen such as a Fourdrinier screen and a sheet of low density, preferably in the order of about 1.24 pounds per cubic foot is produced, but other densities of stock may be successfully molded. This sheet is not calendered but is left in its open porous condition. If desirable, a lubricant, such as calcium stearate in the amount of about 2 parts by weight, may be incorporated into the slurry in the beater or a tub size such as a wax-rosin soap emulsion may be used. Such size has been found to impart additional water resistance to the finished article. This also affords inter-fiber slippage during subsequent formation.

The ratio of binder to filler may be varied to a considerable degree depending upon the type of fiber and the binder used, the temperature of formation, the density desired in the final product, the required strength of the article, and many other variable factors. For most purposes the finished sheet should contain 20 to 35 parts by weight of binder to 80 to 65 parts by weight of fiber.

The web so formed is dried and is normally delivered to the manufacturer of the molded articles in the form of a rolled web. In the event the web as received by the manufacturer, and immediately prior to formation of molded articles therefrom, contains more than about 8 to 10% by weight of moisture, subsequent drying is effected in order to reduce the moisture content to about that amount. If more than about 8 to 10% is present in the stock at the time of mold formation, there is some tendency for the articles to blister in the molds due to the creation of steam. On the other hand, if insufficient moisture is present, formation without cracking or rupture is not possible. For most purposes, the moisture should be within the range of 6 to 10%.

The sheet is died into discs or other shapes of the desired contour and these discs are fed to a semi-positive type die unit which is effective for molding the paper into the desired shape. In the manufacture of screw threaded closures, a circular disc is used (a hat-shaped preform may be used in some instances) and this is fed to a mold cavity and force plug arrangement which is effective for forming the disc into a skirted closure having a screw thread formation on the inner surface of the closure skirt. Where the article is relatively thick, it is desirable to incorporate a plurality of fiber sheets, for it is not at present commercially practicable to manufacture paper webs of the type here under consideration in thicknesses in excess of about .056".

In the molding operation, both the cavity element and the force plug are heated by electricity, steam, or otherwise, and the molds are maintained at a temperature sufficient to bring the temperature of the article to be molded to about 250° F. to 300° F. A molding cycle of about one hundred twenty seconds has been found satisfactory in the manufacture of jar closures having a diameter of seventy millimeters and a thickness of the skirt of about .045", employing pressure of about 8,000 pounds per square inch. Immediately upon completion of the molding cycle, the mold elements are parted and the closure unscrewed from the force plug. Substantially no distortion occurs during this operation of removal and the article has a hard, glass-like surface presenting a polished appearance.

While I do not wish to be limited to any theory, it appears that the zein is so modified by the Vinsol that when temperatures in the neighborhood of 250° F. to 300° F. are applied, excellent flow characteristics result at the applied pressure permitting the paper to be formed into intricate shapes such as screw thread formations. At the same time, the nature of the zein is such that flow ceases prior to the release of pressure and the article may be removed from the mold, the mixture having no tendency whatever to stick to the molds.

From extensive experiments, I have found that this molding operation is possible only when the zein and Vinsol are incorporated in the limited proportions referred to, namely, from 3 parts of zein and 1 part of Vinsol to 2 parts of zein and 1 part of Vinsol. If substantially more than 3 parts of zein are used, the binder will not be uniformly distributed in the finished article for it is only when the zein is properly modified by the Vinsol that a uniform distribution is possible. If the quantity of Vinsol is increased beyond 1 part to 2 parts of zein, then the binder will bleed out to the surface and sticking will occur.

It is essential in the present invention that the starting material contain the binder ingredients in the form of discrete particles. I have found that it is impossible to produce satisfactory articles using identical proportions of binder ingredients by distributing the same over the fibers in solution form as an impregnant. The fact that the binder ingredients must be incorporated as particles brings the problem of uniform distribution over the fibers upon subsequent molding and necessitates critical proportioning as mentioned above.

By incorporating the ingredients of the binder as a powder in the stock in the beater, it is possible to obtain a distribution of the binder particles in the web which constitutes the base stock without materially altering the original characteristics of the felt, particularly those characteristics of flexibility and deformability. It is only by reason of such deformability that it is possible to prepare intricate molded parts from sheets without cracking or rupture. It appears that when the paper is heated in the mold, the zein and Vinsol binder is rendered flowable and immediately spreads out and coats the fibers and at least partially impregnates the individual fibers. There is some tendency for the materials to flow toward the heated mold surfaces but this is limited by the fact that the fibers absorb a substantial portion of the binder and this is also believed to play some part in permitting removal without cooling for the closure consists essentially of fibers. In the example referred to, the fibers constituted about 70 parts by weight to about 30 parts by weight of binder.

The temperature of operation is important for if temperatures are materially in excess of 350° F., the fibers will be charred, and if temperatures below 250° F. are employed, the optimum modifying effect of the Vinsol on the zein is not obtained, and, as a result, the binder will not flow properly and the fibers will not be uniformly coated or impregnated and a poor article will result. It was startling to find that Vinsol which is an extremely sticky substance when in heated condition would so modify zein that the resulting combination could be heated to between 250° F. and 300° F. under pressures as high as 10,000 pounds per square inch and the piece could be removed from the mold without sticking without cooling the molds.

From the work performed on the combination of zein and Vinsol, one would naturally presume that other proteins could be substituted for the zein. I prepared many batches of composition using casein and other proteins in place of the zein, using varying proportions including 75 parts of casein and 25 parts of Vinsol. Unsatisfactory results were obtained in each instance for the final article was not even form-retaining and could not be removed from the molds without excessive distortion. The articles lacked strength and could not have been used for closures. It appears that zein, when modified with Vinsol and heated to a temperature above 250° F., undergoes some change, the exact nature of which is not known. This change may be due in part to the fact that zein, while truly thermoplastic in that it may be repeatedly softened by the application of heat, does not reach a liquid state at any temperature. It flows sluggishly at temperatures above 250° F. but even though the temperature is raised to the point where zein decomposes, there is no liquifying of the material.

On the assumption that other modifiers than Vinsol might give the same results, I experimented with a whole host of modifiers and plasticizers, including resins closely related, chemically, to Vinsol, all without success, clearly indicating that the combination of zein and Vinsol results in a product possessing unique characteristics which, when incorporated with paper fibers in a beater, may form a sheet capable of being hot molded and removed from the molding dies without cooling.

The invention has been described in connection with the manufacture of a molded closure and obviously other molded articles such as buttons, electrical parts, boxes, and other articles may be formed by my method. Substitutions, and additions may be made in the basic sheet stock, substituting other fibers in whole or in part for the kraft fibers, fluxing the zein and Vinsol and then grinding to a powder rather than incorporating the zein and Vinsol as separate powders, and many other variations which those skilled in the art would be expected to make depending upon conditions. The pressure employed in molding is an example and while it will generally be in the neighborhood of 6,000 to 10,000 pounds per square inch, the pressure used will depend upon the density of the sheet stock, the shape of the pieces to be molded, the density required in the final piece, and other variable factors.

My copending application, Serial No. 512,044, filed November 27, 1943, discloses and claims a molding composition and method of manufacturing molded articles having a binder of zein and the gasoline-insoluble fraction of pine wood resin.

While I have described a preferred embodiment of my invention, the same may be otherwise embodied and practiced within the scope of the following claims.

I claim:

1. In a method of hot molding articles from a molding material in the form of a paper carrier containing therein a thermoplastic binder, the essential ingredients of which consist of zein and the substantially gasoline-insoluble fraction of pine wood resin, the steps comprising charging a mold with a deformable paper carrier containing distributed therethrough particles of a thermoplastic binder of zein and the substantially gasoline-insoluble fraction of pine wood resin in the ratio of about 3:1 to about 2:1, said binder being mechanically held in the web, applying heat and pressure to said molding material to cause the same to assume the contour of the mold and to elevate the molding material to a temperature between about 250° F. and 300° F., maintaining heat and pressure until said binder has been caused to flow substantially uniformly throughout the extent of the molding material to bind the same into an article having the contour of the mold, opening the mold while heated to said molding temperature, and removing the molded piece therefrom.

2. In a method of hot molding articles from a molding material in the form of a paper carrier containing therein a thermoplastic binder, the essential ingredients of which consist of zein and the substantially gasoline-insoluble fraction of pine wood resin, the steps comprising charging a pair of coacting molds with a readily deformable paper carrier containing distributed therethrough particles of a thermoplastic binder of zein and the substantially gasoline-insoluble fraction of pine wood resin in the ratio of about 3:1, said binder being mechanically held in the web, applying heat and pressure to said molding material to cause the same to assume the contour of the mold elements and to bring the temperature of the molding material to a point between about 250° F. and about 300° F., maintaining heat and pressure on the molding material until the binder has been caused to flow substantially uniformly throughout the extent of the molding material to bind the same into an article having the contour of the mold elements, and removing the molded piece from the mold while heated to substantially said molding temperature.

3. In a method of hot molding articles from a molding material in the form of a water-laid paper web of low density containing therein a thermoplastic binder, the essential ingredients of which consist of zein and the substantially gasoline-insoluble fraction of pine wood resin, the steps comprising charging a mold with a disc of readily deformable water-laid paper of low density having distributed therethrough particles of a thermoplastic binder of zein and the substantially gasoline-insoluble fraction of pine wood resin in the ratio of about 3:1 to about 2:1, said binder being distributed throughout the web as discrete particles in the water-laying process, heating the molding material in the mold to elevate its temperature to a point between about 250° F. and about 300° F., applying pressure to the molding material while heated to such point to cause the binder to flow substantially uniformly throughout the extent of the molding material and bind the fibers into an article having a contour corresponding to that of the mold, and removing the molded piece from the mold at substantially said temperature.

4. In a method of hot molding articles from a molding material in the form of a paper carrier containing therein a thermoplastic binder, the essential ingredients of which consist of zein and the substantially gasoline-insoluble fraction of pine wood resin, the steps comprising charging a mold with a readily deformable paper carrier containing particles of a thermoplastic binder of zein and the substantially gasoline-insoluble fraction of pine wood resin in the ratio of about 3:1 to about 2:1, said binder being mechanically held in the web as discrete particles, applying heat to the molding material to bring the temperature thereof to a point between about 250° F. and 300° F., applying pressure from about 6,000 pounds to about 10,000 pounds per square inch to the molding material, maintaining said heat and pressure until the binder has been caused to flow substantially uniformly throughout the extent of the molding material to bind the fibers into an article having the contour of the mold, releasing the pressure and opening the mold while heated to substantially said molding temperature, and immediately thereafter removing the molded piece from the mold elements.

5. In a method of molding a closure from a molding material in the form of a paper carrier containing therein a thermoplastic binder, the essential ingredients of which consist of zein and the substantially gasoline-insoluble fraction of pine wood resin, the steps comprising charging a mold with a sheet of readily deformable water-laid paper stock containing distributed particles of a thermoplastic binder of zein and the substantially gasoline-insoluble fraction of pine wood resin in the ratio of about 3:1 to about 2:1, applying heat and pressure to the paper stock to cause the same to assume the contour of the mold and to elevate the temperature of the stock to a point between 250° F. and about 300° F., maintaining heat and pressure on said stock until the binder has been caused to flow substantially uniformly throughout the extent of the stock to bind the same into an article having the contour of the mold, and discharging the molded piece from the mold prior to any substantial reduction in the temperature thereof.

6. In a method of hot molding articles from a molding material in the form of a paper carrier containing therein a thermoplastic binder, the essential ingredients of which consist of zein and the substantially gasoline-insoluble fraction of pine wood resin, by the application of heat and pressure and without cooling the molded piece prior to removal from the mold, the steps comprising applying heat and pressure to a charge of molding material in the form of a deformable paper carrier containing particles of a thermoplastic binder of zein and the substantially gasoline-insoluble fraction of pine wood resin in the ratio of about 3:1 to about 2:1, the binder being present in the range between about 20 to 35 parts by weight to about 80 to 65 parts by weight of fiber, elevating the molding material to a temperature in the range between about 250° F. and 300° F., maintaining pressure while said temperature condition exists in the mass to be molded until the binder has been caused to flow substantially uniformly throughout the extent of the molding material to bind the same into an article having the contour of the mold, and removing the molded piece from the mold while at said molding temperature.

7. In a method of hot molding articles from a molding material in the form of a paper carrier containing therein a thermoplastic binder, the essential ingredients of which consist of zein and the substantially gasoline-insoluble fraction of pine wood resin, the steps comprising charging a mold with a deformable paper carrier having a water content between 6% and 10% based on the weight of the paper and containing distributed therethrough particles of a thermoplastic binder of zein and the substantially gasoline-insoluble fraction of pine wood resin in the ratio of about 3:1 to about 2:1, said binder being mechanically held in the web, applying heat and pressure to said molding material to cause the same to assume the contour of the mold and elevate the molding material to a temperature between about 250° F. and about 300° F., maintaining heat and pressure until said binder has been caused to flow substantially uniformly throughout the extent of the molding material to bind the same into an article having the contour of the mold, opening the mold while heated to said molding temperature, and removing the molded piece therefrom.

VICTOR A. NAVIKAS.